United States Patent
Lee (10) Patent No.: US 9,574,957 B1
(45) Date of Patent: Feb. 21, 2017

(54) APPARATUS FOR MEASURING CONVERGENCE AND CEILING SUBSIDENCE USING FIBER BRAGG GRATING SENSOR

(71) Applicant: FBG KOREA INC., Gwangju (KR)

(72) Inventor: Geum Suk Lee, Daejeon (KR)

(73) Assignee: FBG KOREA INC., Gwangju (KR)

( * ) Notice: Subject to any disclaimer, the term of this patent is extended or adjusted under 35 U.S.C. 154(b) by 0 days.

(21) Appl. No.: 15/152,632

(22) Filed: May 12, 2016

(30) Foreign Application Priority Data

Aug. 24, 2015 (KR) .......................... 10-2015-0119112

(51) Int. Cl.
| | |
|---|---|
| G01B 11/16 | (2006.01) |
| G01L 1/24 | (2006.01) |
| G01L 5/00 | (2006.01) |
| G01B 11/14 | (2006.01) |
| G01B 11/26 | (2006.01) |

(52) U.S. Cl.
CPC .............. *G01L 1/246* (2013.01); *G01B 11/14* (2013.01); *G01B 11/26* (2013.01); *G01L 5/00* (2013.01)

(58) Field of Classification Search
CPC ......... G01B 11/16; G01B 11/14; G01B 11/26; G01L 5/00
USPC .......................................................... 356/32
See application file for complete search history.

(56) References Cited

U.S. PATENT DOCUMENTS

| | | | | |
|---|---|---|---|---|
| 7,418,185 | B2 * | 8/2008 | Lee ........................ | G01B 11/18 385/137 |
| 7,646,946 | B2 * | 1/2010 | Lagakos ................ | G01D 5/268 250/227.11 |
| 7,956,733 | B1 * | 6/2011 | Nechitailo .............. | F41A 17/06 244/3.1 |
| 2006/0204199 | A1 * | 9/2006 | Lee ........................ | G01B 11/18 385/137 |

FOREIGN PATENT DOCUMENTS

| | | |
|---|---|---|
| KR | 10-0796161 | 1/2008 |
| KR | 10-0857306 | 9/2008 |

* cited by examiner

*Primary Examiner* — Roy M Punnoose
(74) *Attorney, Agent, or Firm* — Novick, Kim & Lee, PLLC; Jae Youn Kim (57) ABSTRACT

Provided is an apparatus for measuring convergence and ceiling subsidence using a fiber bragg grating sensor. The apparatus includes a plurality of unit-fiber bragg grating sensor modules having a predetermined length and sequentially connected to each other, where each of the sensor modules comprises: a fiber bragg grating stain sensor installed in a protective tube to sense a variation of a length; an installing member installed in parallel to one side of the protective tube; a fiber bragg grating angle displacement sensor mounted on the installing member to measure angle displacement; bases provided at both ends of each sensor module to connect adjacent sensor modules to each other; and a fixing member and a fixing unit to fix both ends of the protective tube and the installing member to the bases, respectively. Each of the sensor modules continuously measures two-dimensional or three-dimensional convergence and ceiling subsidence. Thus, the plurality of fiber bragg grating sensors are sequentially mounted on a measuring target to measure a moving distance and angle displacement due to section strain, so that convergence and ceiling subsidence may be precisely measured.

10 Claims, 7 Drawing Sheets

FIG. 8

APPARATUS FOR MEASURING CONVERGENCE AND CEILING SUBSIDENCE USING FIBER BRAGG GRATING SENSOR

BACKGROUND

The embodiment relates to an apparatus for measuring convergence and ceiling subsidence using a fiber bragg grating sensor, and more particularly, to an apparatus for measuring convergence and ceiling subsidence using a fiber bragg grating sensor, which measures convergence and ceiling subsidence in real time while constructing and maintaining a tunnel.

In case of measuring the convergence of a tunnel, when a variation on a section of the tunnel only in a longitudinal direction is measured, since the directionality of coordinates cannot be known due to the strain property of lining after the lining is strained, if it is not known whether a tunnel is contracted or expanded, it is difficult to precisely measure the convergence of the tunnel.

Thus, according to a method of measuring convergence and ceiling subsidence, a length variation measuring sensor is buried while passing through the lining of a tunnel such that it is determined whether a tunnel is contracted or expanded. Differently, after degrees of length and angle variations are measured by using displacement and angle sensors for measuring convergence, two measurement results are combined with each other to be converted into convergence.

Since an electric sensor system utilizing the latter measures two kinds of values in connection with length and angle variations in mutually different measuring schemes, the accuracy of convergence measurement is dependent on the mutually different measurement accuracies of two kinds of sensors. In addition, since two-kinds of sensor systems are used, a device of collecting data is complex and the measuring cost is relatively increased.

Further, when a measurement length is 1 m, since a sensor having resolution of 1/100 mm and 1/100 degree is mainly used, there is a limit to measure a micro-strain.

In addition, as the measurement reliability is deteriorated due to effects of electromagnetic waves, the measurement cannot be performed while the subway is operated.

To solve the problems, the applicant has filed techniques of measuring convergence and ceiling subsidence by using a plurality of fiber bragg grating sensors as disclosed in following patent documents 1 and 2, which have been registered now.

However, an apparatus for measuring convergence and ceiling subsidence according to the related art including the patent document 1 and 2 includes a fiber bragg grating sensor mounted on a flat surface, so that there is a limit in the accuracy of 2D and 3D measurements.

However, when a gap is generated due to an interference substance formed on a target object on which an apparatus for measuring convergence and ceiling subsidence according to the related art will be mounted, it is difficult to mount the apparatus for measuring convergence and ceiling subsidence, so that the accuracy of a measured value is greatly deteriorated.

In addition, an apparatus for measuring convergence and ceiling subsidence according to the related art includes an angle displacement sensor mounted on a strain sensor, so that an error occurs in the measured value of length displacement due to a weight of the angle displacement sensor.

SUMMARY

To solve the problems described above, one object of the embodiment is to provide an apparatus for measuring convergence and ceiling subsidence using a fiber bragg grating sensor, which is capable of precisely measuring convergence and ceiling subsidence while constructing and maintaining a tunnel.

Another object of the embodiment is to provide an apparatus for measuring convergence and ceiling subsidence using a fiber bragg grating sensor, which is capable of adjusting an installing position and an installing angle of a fixing unit for fixing a sensor module to install the sensor module in a tunnel, so that the reliability of measured data is improved even though tolerance occurs when installing a sensor module.

To achieve the objects described above, according to the embodiment, there is provided an apparatus for measuring convergence and ceiling subsidence using a fiber bragg grating sensor, which includes a plurality of unit-fiber bragg grating sensor modules having a predetermined length and sequentially connected to each other, wherein each of the sensor modules includes a fiber bragg grating stain sensor installed in a protective tube to sense a variation of a length; an installing member installed in parallel to one side of the protective tube; and a fiber bragg grating angle displacement sensor mounted on the installing member to measure angle displacement, so that each of the sensor modules continuously measures two-dimensional or three-dimensional convergence and ceiling subsidence.

In addition, the apparatus further includes bases provided at both ends of each sensor module to connect adjacent sensor modules to each other, a fixing member and a fixing unit to fix both ends of the protective tube and the installing member to the bases, respectively, wherein coupling members are provided to both ends of the protective tube to be movable along the protective tube in order to adjust an installing distance and an installing angle of the fiber bragg grating strain sensor according to a distance between the bases and an installing angle of the base, and the coupling member is fixedly inserted between the base and the fixing member.

The installing member is prepared as a rail having a bar shape, and the apparatus further includes first and second links connected to both ends of the installing member to adjust an installing distance and an installing angle of the installing member according to the distance between the bases and the installing angle of the base.

One end of the first link is coupled to one end of the installing member such that the first link is rotatable in a horizontal direction, and an opposite end of the first link is coupled to the fixing unit such that the first link is rotatable in a vertical direction.

One end of the second link is coupled to an opposite end of the installing member such that the first link is rotatable in a horizontal direction, and a coupling member is provided to an opposite end of the second link such that the coupling member is movable along the second link.

The fixing unit includes a first bracket fixed to the base; and a second bracket coupled to one side of the first bracket such that the second bracket fixes the first link coupled to the installing member to allow the first link to be rotatable in the vertical direction, wherein the second bracket is provided with a connecting shaft inserted into a shaft hole formed in the first link.

The apparatus further includes a pair of fixing members and fixing units coupled to the base to simultaneously install a pair of sensor modules adjacent to each other.

As described above, according to the apparatus for measuring convergence and ceiling subsidence using a fiber bragg grating sensor according to the embodiment, the plurality of fiber bragg grating sensors are sequentially mounted on a measuring target to measure a moving distance and angle displacement due to section strain, so that convergence and ceiling subsidence may be precisely measured.

In addition, according to the embodiment, there is no effect of electromagnetic waves and resolution is very excellent, so that convergence and ceiling subsidence may be measured by using the fiber bragg grating strain sensor and the angle displacement sensor having high measurement reliability.

In addition, according to the embodiment, there is provided a method of measuring convergence and ceiling subsidence using a fiber bragg grating sensor, which is capable of performing safety diagnosis at ordinary times and simultaneously measuring length displacement and angle displacement in a single system.

In addition, according to the embodiment, the strain sensor is mounted on a protective tube and the angle displacement sensor is installed in parallel to the strain sensor, so that an error may be prevented from occurring due to the weight of the angle displacement sensor mounted on the protective tube according to the related art, thereby improving the measurement accuracy.

In addition, according to the embodiment, even though tolerances occur in the installing distance and angle of the base due to a shape of the ceiling of a tunnel, the errors may be compensated by adjusting the installing distance and angle of the strain sensor and the installing member, so that each sensor may be stably installed.

In addition, according to the embodiment, the effect of electromagnetic waves, which is a drawback of an electric type system, is perfectly overcome, so that the measurement of the convergence of a subway tunnel while a subway is operated, which has been impossible until recently, may be enabled at ordinary times and the accuracy may be improved due to the excellent characteristics of the fiber bragg grating sensor. In addition, sensors of maximum 40 may be directly connected by using one thread of fiber, so that the sensors may be installed in a space smaller than that of the electric type system according to the related art.

In addition, according to the embodiment, since the intrinsic reflective wavelength of the fiber bragg grating sensor is measured, the same measuring scheme is used, so that an ordinary safety diagnosis may be performed by using a single measuring system and the accumulated convergence may be measured in comparison with an initial value of a civil engineering structure.

DETAILED DESCRIPTION OF THE EMBODIMENTS

Hereinafter, an apparatus and a method for measuring convergence and ceiling subsidence using a fiber bragg grating sensor according to the embodiment will be described in detail with reference to accompanying drawings.

Figure 1:
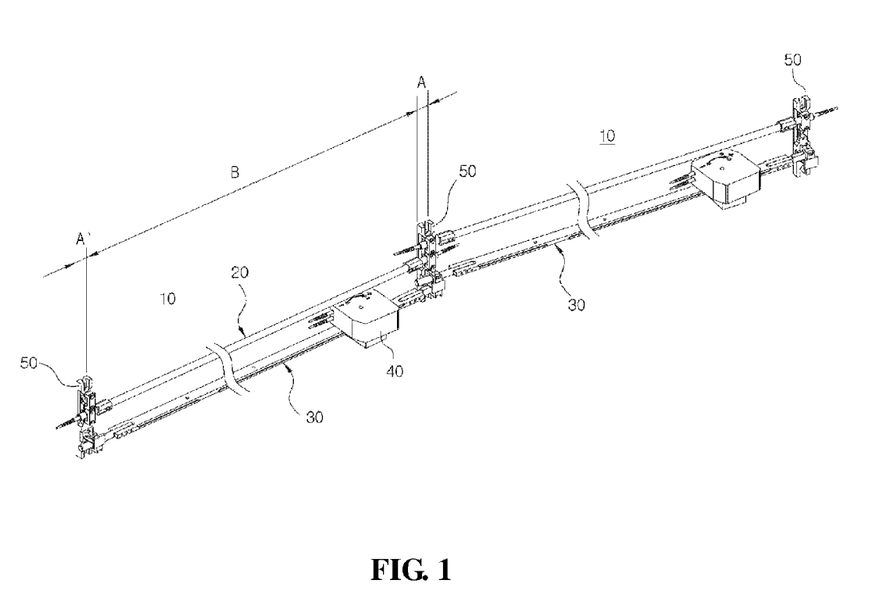
FIG. 1 is a perspective view showing an apparatus for measuring convergence and ceiling subsidence using a fiber bragg grating sensor according to the embodiment.
Figure 2:
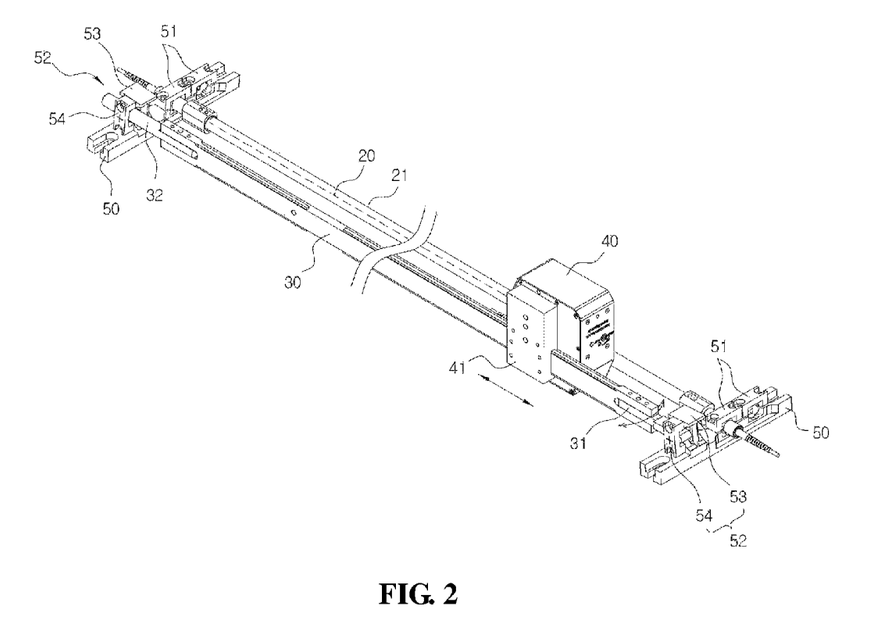
FIGS. 2 and 3 are an enlarged perspective view and a partially enlarged perspective view of a unit-fiber bragg grating sensor module depicted in FIG. 1.
Figure 3:
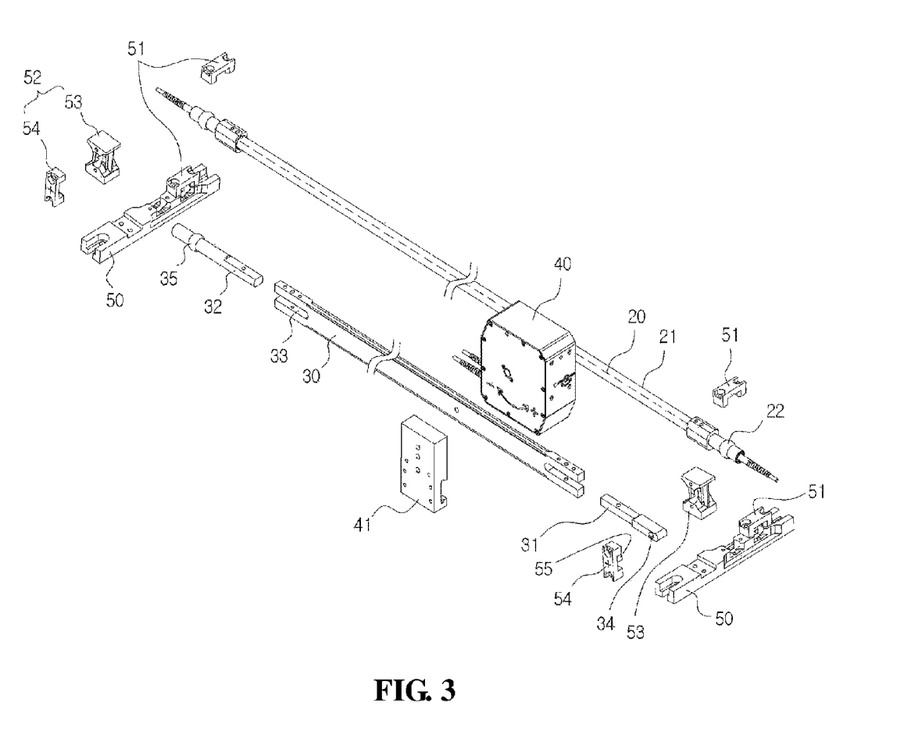

FIG. 1 is a perspective view showing an apparatus for measuring convergence and ceiling subsidence using a fiber bragg grating sensor according to the embodiment. FIGS. 2 and 3 are an enlarged perspective view and a partially enlarged perspective view of a unit-fiber bragg grating sensor module depicted in FIG. 1.

As shown in FIG. 1, an apparatus and a method for measuring convergence and ceiling subsidence using a fiber bragg grating sensor according to the embodiment includes a plurality of unit-fiber bragg grating sensor modules (hereinafter, referred to as 'sensor module') 10 each having a predetermined length and sequentially connected to each other.

As shown in FIGS. 1 to 3, each sensor module 10 includes a fiber bragg grating strain sensor (hereinafter, referred to as 'strain sensor') 20 which is installed in a protective tube 21 formed of a pipe having a section of a rectangular or circular shape in order to sense a length variation, an installing member 30 installed in parallel on one side of the protective tube 21, and a fiber bragg grating angle displacement sensor (hereinafter, referred to as 'angle displacement sensor') 40 which is mounted on the installing member 30 in order to measure angle displacement.

In addition, each sensor module 10 may further include bases 50 provided to both ends of the sensor module 10 to connect the sensor modules to each other, and a fixing member 51 and a fixing unit 52 for fixing ends of the protective tube 21 and the installing member 30 to the base 50, respectively.

Thus, the sensor modules 10 may be sequentially connected to each other through the bases 50 and may be sequentially installed onto an inner sectional surface of a tunnel while having typical coordinates.

For example, each sensor module 10 may be prepared to have a length of about 1 m.

In addition, the strain sensor 20 may have the resolution of about $1/10,000,000$ to measure length displacement and the angle displacement sensor 40 may have the resolution of about $1/1,000$ degree.

As shown in FIG. 2, the strain sensor 20 may be installed between the bases 50 in the protective tube 21 while crossing the protective tube 21 in a longitudinal direction, and coupling members 22 may be provided to both ends of the strain sensor 20, such that each of the coupling member 22 may be movable along the protective tube 21 and inserted and fixed between the base 50 and the fixing member 51.

The coupling member 22 may be substantially formed in a ball shape and may be provided at the central portion thereof with a through-hole into which the protective tube 21 is inserted.

Thus, according to the embodiment, the coupling member having the ball shape is moved along the protective pipe according to the distance between the bases desired to install the strain sensor and the installing angles of the bases in order to adjust the position thereof, and then, is fixed between the base and the fixing member, so that the installing position and angle of the strain sensor may be adjusted.

The installing member 30 may be prepared with a rail substantially formed in a bar shape and connected to each of the first and second links 31 and 32.

Inserting grooves 33 having a substantial 'C' shape when being viewed from a side may be formed in both ends of the installing member 30.

The first link 31 is fixed to the installing member 30 by a fixing pin in a state that one end of the first link 31 is inserted into the inserting groove 33.

In this case, the first link 31 and the installing member 30 may be rotated in the horizontal direction about the fixing pin.

A shaft hole 34 is formed on the opposite end of the first link 31 in a transverse direction and a connecting shaft 55 formed on the fixing unit 52 fixing the first link 31 to the base 50 is inserted into the shaft hole 34.

So, the first link 31 may be vertically rotated about the connecting shaft 55.

Thus, referring to FIG. 2, the first link 31 is horizontally rotatable about the fixing pin while being coupled to one end of the installing member 30, that is, the right side end when referring to FIG. 2, and is vertically rotatable while being coupled to the fixing unit 52.

The second link 32 may be formed in a shape similar to that of the first link 31, and a coupling member 35, which has the same shape and function as the above described coupling member 22, may be coupled to an outer side end of the second link 32, that is, a rear side end when referring to FIG. 2.

That is, an installing angle of the second link 32 is adjusted by the coupling member 35 and the second link 32 is horizontally rotatable together with one end of the installing member 33, that is, a rear side end of the installing member 33 when viewed from FIG. 2.

As described above, according to the embodiment, the first and second links are provided to both ends of the installing member and the opposite end of the installing member may be fixed to be horizontally and vertically rotatable by using the first link in the state that the one end of the installing member is fixed to be horizontally rotatable.

Thus, an angle of the installing member 30 may be varied according to the displacement of a measurement target object.

The angle displacement sensor 40 may be substantially formed in a rectangular parallelepiped shape and may be installed to be movable and rotatable along the installing member 30.

The coupling member 41 is slidably coupled to an outside of the installing member 30 and the angle displacement sensor 40 is rotatably coupled to the coupling member 41 through a fixing bolt.

That is, according to the embodiment, the angle displacement sensor may be installed to be movable along the installing member, so that interference due to the shape of a measurement target object may be removed.

The increase and decrease signs (+,−) of a wavelength according to the rotation direction may be denoted on one side surface of the angle displacement sensor 40, such that the variation of the wavelength according to the installing angle of the angle displacement sensor 40 may be easily confirmed.

In addition, a fixing member for fixing a weight for applying a load to the fiber bragg grating sensor installed therein may be provided to one side of the angle displacement sensor 40.

A fixing bolt may serve as the fixing member, such that the fiber bragg grating sensor is prevented from being damaged or out of order due to the movement of the weight during installation of the angle displacement sensor 40.

Thus, the signs (stop, play) of fixing and releasing directions of the weight according to the rotation direction of the fixing member may be denoted on one side surface of the angle displacement sensor 40.

The base 50 may be formed of a block substantially having a rectangular parallelepiped shape, and the fixing member 51 may have a section substantially having a 'reverse-U' sectional shape when viewed from a front.

A fixing groove may be formed on a top surface of the base 50 and a lower portion of the fixing member 51 to fix the coupling member 35 provided to the strain sensor 20 in the stat that the fixing member 51 is coupled to the base 50.

The fixing groove may be substantially formed in a shape corresponding to the shape of the coupling member 22 and may have a diameter slightly smaller than that of the coupling member 22 to modify the coupling member 22 so that the coupling member 22 may be stably fixed.

Meanwhile, a pair of the fixing member 51 and the fixing unit 52 may be coupled to the base 50 to install a pair of sensor modules 10 adjacent to each other.

The fixing unit 52 may include a first bracket 53 fixed to the base 50 and a second bracket 54 coupled to one side of the first bracket 53 to fix the first link 31 coupled to the installing member 30 to be vertically rotatable.

The first bracket 53 fixes the first and second links 31 and 32 of the sensor module 10 adjacent to each other to both sides thereof.

To this end, in order that one side of the first bracket 53, that is, the left when referring to FIG. 2 is coupled to the first link 31 and the right is coupled to the second link 32, both ends of the first bracket 53 may be formed corresponding to front ends of the first and second links 31 and 32, respectively.

The right of the second bracket 54 when viewed from the front thereof may be opened so that the section substantially has a 'C' shape, and a connecting shaft 55 may be formed on the central portion of the second bracket 54.

Thus, the first link 31 may be vertically rotatable about the connecting shaft 55 of the second bracket 54.

Next, a measuring method of an apparatus for measuring convergence and ceiling subsidence using a fiber bragg grating sensor according to the embodiment will be described in detail.

Figure 4:
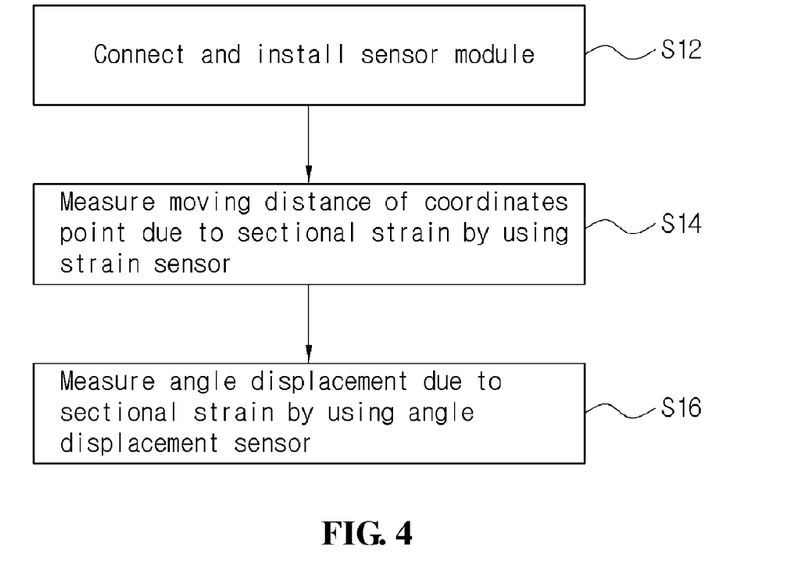
FIG. 4 is a flowchart illustrating a measuring method of an apparatus for measuring convergence and ceiling subsidence using a fiber bragg grating sensor step by step according to the embodiment.

FIG. 4 is a flowchart illustrating a measuring method of an apparatus for measuring convergence and ceiling subsidence using a fiber bragg grating sensor step by step according to the embodiment.

Figure 5:
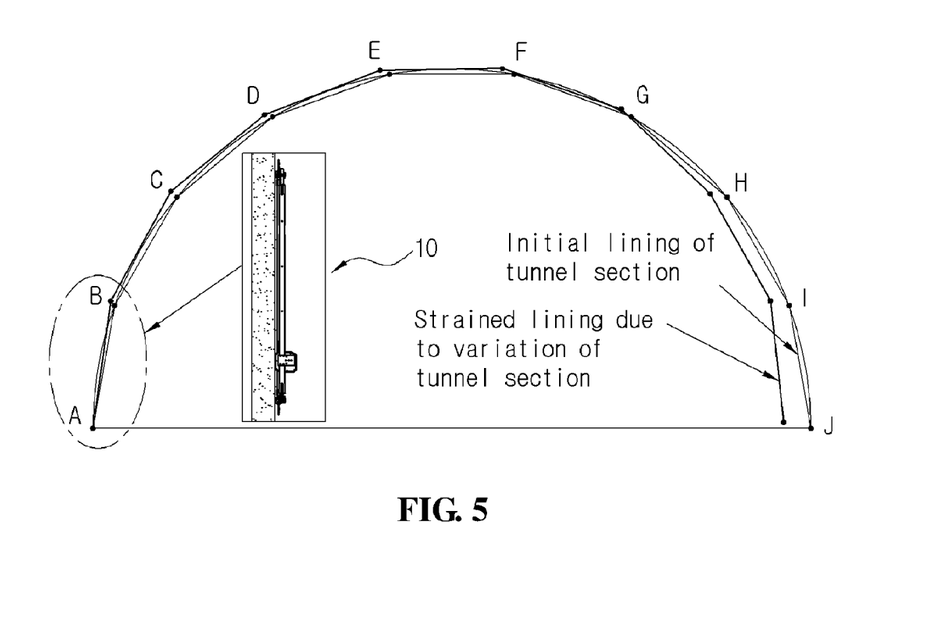
FIG. 5 is a view showing a state of an apparatus for measuring convergence and ceiling subsidence using a fiber bragg grating sensor installed in a tunnel.
Figure 6:
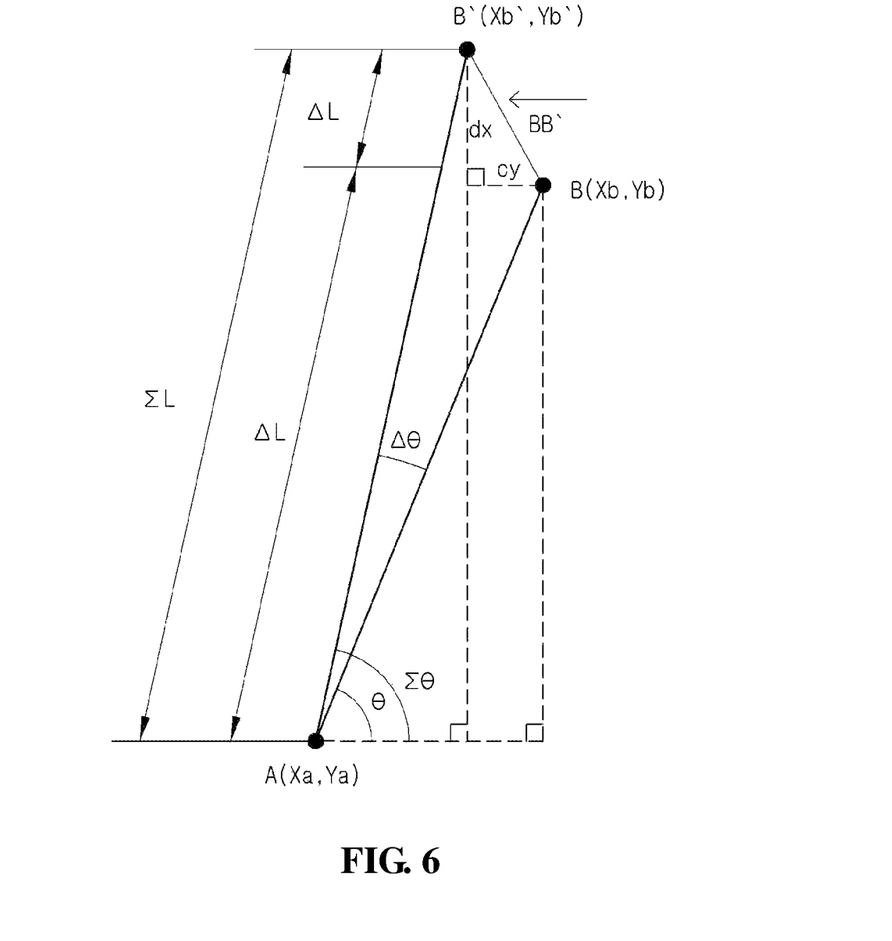
FIG. 6 is a view illustrating a principle of measuring vector dx and dy according to convergence and ceiling subsidence of a tunnel.

FIG. 5 is a view showing a state of an apparatus for measuring convergence and ceiling subsidence using a fiber bragg grating sensor installed in a tunnel. FIG. 6 is a view illustrating a principle of measuring vector dx and dy according to convergence and ceiling subsidence of a tunnel.

First, the sensor modules are designed and installed corresponding to a length of lining by connecting the sensor modules to each other in a longitudinal direction along the ceiling of a tunnel which is a measuring target.

That is, in step S12 of FIG. 4, the bases 50 are installed along the ceiling of the tunnel every a constant interval to correspond to the length of the sensor module 10, and the strain sensor 20, the installing member 30 and the angle displacement sensor 40 are installed between a pair of bases 50.

In this case, when an installing tolerance of the base 50 is generated according to a shape of the ceiling of the tunnel, the position of the coupling member 22 may be moved such that the strain sensor 20 may be installed stably without regard to the installing tolerance.

In addition, the installing member 30 may be installed by first fixing one end coupled to the second link 32 and then, fixing the opposite end coupled to the first link 31 in sequence.

Thus, the installing member 30 is horizontally rotatable about the fixing pin coupled to the second link 32 and vertically and horizontally rotatable about the fixing pin coupled to the first link 31 and the connecting shaft 55 of the fixing unit 52, respectively, so that tolerance of the installing distance and angle between the bases 50 may be compensated, thereby stably installing the bases 50.

Therefore, the angle displacement sensor 40 is movably mounted on the installing member 30, so that the angle displacement sensor 40 may be installed at a position capable of minimizing the interference due to the shape of the tunnel ceiling and the angle displacement due to the convergence and ceiling subsidence of the tunnel ceiling may be precisely measured.

For example, since the sensor module 10 is prepared to have the length of about 1 m, as shown in FIG. 5, point A is an observing point and point B is a measuring point.

That is, in FIGS. 5 and 6, when B is a measuring point, A is an observing point. When A is a measuring point, B is an observing point. Thus, when the lining is strained so that points B~D are moved, B'~D' are formed as new coordinates and coordinates A is not changed.

A basic principle of measuring lining strain in the sensor module 10 is classified into an 'absolute coordinate scheme' and a 'relative coordinate scheme' according to a method of obtaining convergence.

Figure 7:
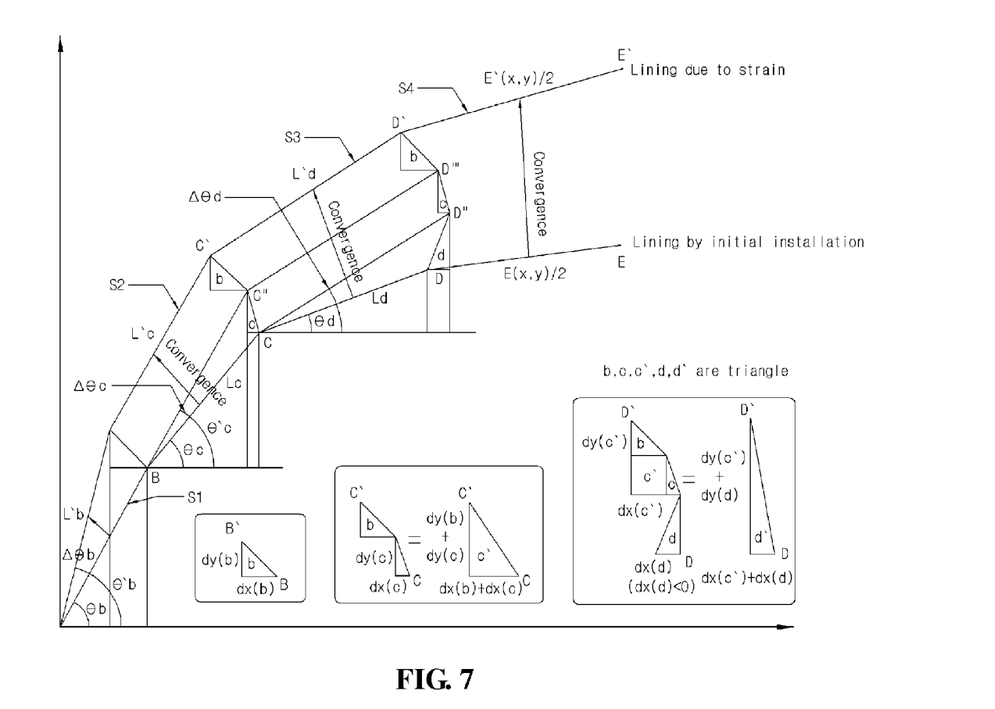
FIG. 7 is a view illustrating a measuring principle of an absolute coordinate scheme of lining convergence and ceiling subsidence.
Figure 8:
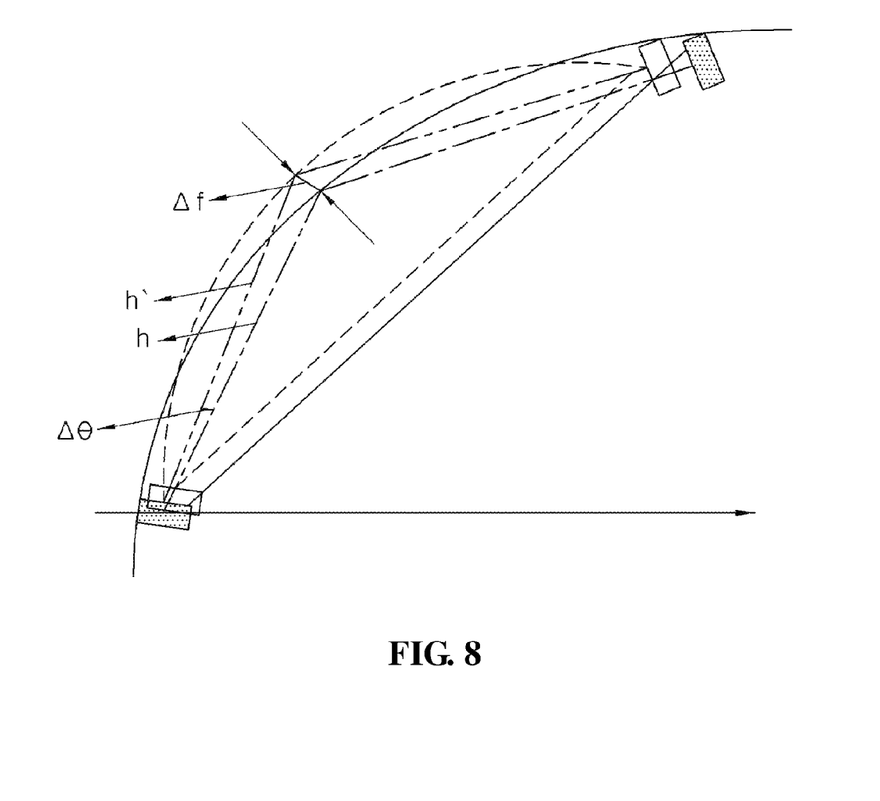
FIG. 8 is a view illustrating a measuring principle of a relative coordinate scheme of lining convergence and ceiling subsidence.

FIG. 7 is a view illustrating a measuring principle of an absolute coordinate scheme of lining convergence and ceiling subsidence. FIG. 8 is a view illustrating a measuring principle of a relative coordinate scheme of lining convergence and ceiling subsidence.

In the measurement of an absolute coordinate scheme, as shown in FIG. 7, the convergence is a moving distance between the central point coordinates after strain and the central point coordinates before strain. ok Therefore, it is necessarily required to recognize the coordinates of the measuring point before strain.

To the contrary, in the relative coordinate scheme, as shown in FIG. 8, a curvature variation ($\Delta f$) value, which is obtained from a trigonometric functional relationship based on one sight variation, is set as the convergence by using the length and angle variations caused by strain regardless of coordinates.

Meanwhile, when a sensor module 10 located at a middle position in a sequence of sensor modules 10 on one section is out of order, an error value caused due to non-generation of new coordinates or a malfunction of the sensor module 10 may be transferred.

To the contrary, in the relative coordinate scheme, in case of the above, since each sensor module 10 independently performs measuring operations, although all convergence for normal sensor modules 10 may be obtained, when an angle change is very small due to abbreviation of a formula value, the relative coordinate scheme has accuracy.

Hereinafter, the measurement according to the absolute coordinate scheme will be described in more detail. When the sensor modules 10 for measuring the section strain of a tunnel are installed in the range of S1~S4 along the ceiling of a tunnel section as shown in FIG. 7, if the section strain occurs, the coordinate points may move as shown by coordinates B'~D' and the sensor module 10 may be subject to the coordinate movement of a preceding sensor module 10.

In case of a sensor module 10 installed in the range of S1, since any preceding sensor modules 10 do not exist, the movement from B to B' may be represented only as components of dx(b) and dy(b).

Since each installation coordinates point (A~D) is previously known by the installing point design of the sensor module 10, a varied coordinates point B'(Xb',Yb') may be obtained through a trigonometric function by $\theta b$ and $L_b$ as expressed as following Equation 1.

$$Xb'=Xa+\text{Cos}(\theta'_b) \times L'_b$$

$$Yb'=Ya+\text{Sin}(\theta'_b) \times L'_b \qquad \text{[Equation 1]}$$

Where $\theta'_b=\theta_b+\Delta\theta_b$, $L'_b=L_b+\Delta L_b$.

Therefore, dx and dy may be calculated by using B(Xb, Yb) and B'(Xb', Yb') according to following Equation 2:

$$dx(b)=Xb'-Xb$$

$$dy(b)=Yb'-Yb \qquad \text{[Equation 2]}$$

As the result, the variation of the tunnel section at point B may be obtained by calculating $\Delta\theta_b$ and $\Delta L_b$ according to Equation 2.

The pure strain of the sensor module 10 installed in range S2 moves from C to C', and the coordinates of C' is a value obtained by adding dx(b) and dy(b), which are moving components of S1 from point B to point B', to the coordinates of C'.

$$Xc'=Xb'+\text{Cos}(\theta'_c) \times L'_c$$

$$Yb'=Yb'+\text{Sin}(\theta'_c) \times L \times c$$

$$dx(c')=Xc'-Xc$$

$$dy(c')=Yc'-Yc \qquad \text{[Equation 3]}$$

Thus, point C' may be obtained by Equation 3, and the other coordinates D' and E' may be also obtained in the same scheme.

The measurement of lining strain by using the sensor module 10 according to the relative coordinate scheme is as follows.

In FIG. 8, the curvature variations $\Delta f$ and h', h are expressed as following Equation 4 and axial force and bending moment are obtained by using the curvature variations as convergence. That is, if $\Delta\theta$ and $\Delta L$ are obtained, each of the coordinates and independent convergence may be obtained from each sensor module 10.

$$\Delta f = \sqrt{h'^2 + h^2 - 2h'h\cos(\Delta\theta)} \qquad \text{[Equation 4]}$$

$$h' \simeq \frac{L + \Delta L}{2}$$

$$h \simeq \frac{L}{2}$$

In the measuring principles of the absolute coordinate scheme and the relative coordinate scheme, consequently, it is enough if $\Delta\theta$ and $\Delta L$ are obtained from each sensor module 10.

The sensor module 10 of FIG. 1 has parts A, B and A', and both ends of part B are fitted into parts A and A', respectively, in such a manner that one end of the B part is integrally fixed with the part A by using a coupling member such as a bolt, and the opposite end of part B is slidable lengthwise in part A'. In this structure, the moving distance $\Delta L$ of the coordinate points caused by the section strain can be precisely obtained by the strain sensor 20 (S14).

In addition, in step S16, as the front-rear movement occurs due to the section strain, $\Delta\theta$ value can be obtained by the angle displacement sensor 40.

In addition to the method of measuring two-dimensional convergence, if necessary, three-dimensional convergence may be measured through a similar scheme.

That is, if a single-axis angle displacement sensor for measuring two-dimensional convergence is exchanged as a two axes angle displacement sensor, three-dimensional convergence may be measured.

In case of a two-axes angle displacement sensor, if two one-axis FBG angle displacement sensors are integrally fixed to each other while being at right angles with each other, the two-axes angle displacement sensor is obtained.

Thus, when a one-axis angle displacement sensor is added to an apparatus installed to measure two-dimensional convergence according to according to the related art, it is possible to measure three-dimensional convergence.

By the steps described above, when a plurality of fiber bragg grating sensors are sequentially installed to a measuring target object such as a tunnel according to the embodiment, the coordinate moving distance and angle displacement due to section strain are measured, so that the convergence and ceiling subsidence may be precisely measured.

According to the embodiment, a plurality of fiber bragg grating sensors are sequentially installed to measure the coordinate moving distance and angle displacement due to the section strain, so that the embodiment may be applied to a technique of measuring convergence and ceiling subsidence.

What is claimed is:

1. An apparatus for measuring convergence and ceiling subsidence using a fiber bragg grating sensor, the apparatus comprising:
a plurality of unit-fiber bragg grating sensor modules having a predetermined length and sequentially connected to each other,
wherein each of the sensor modules comprises:
a fiber bragg grating strain sensor installed in a protective tube to sense a variation of a length;
an installing member installed in parallel to one side of the protective tube;
a fiber bragg grating angle displacement sensor mounted on the installing member to measure angle displacement;
bases provided at both ends of each sensor module to connect adjacent sensor modules to each other; and
a fixing member and a fixing unit to fix both ends of the protective tube and the installing member to the bases, respectively,
wherein each of the sensor modules continuously measures two-dimensional or three-dimensional convergence and ceiling subsidence, and
coupling members are provided to both ends of the protective tube to be movable along the protective tube in order to adjust an installing distance and an installing angle of the fiber bragg grating strain sensor according to a distance between the bases and an installing angle of the base, and
wherein the coupling member is fixedly inserted between the base and the fixing member.

2. The apparatus of claim 1, wherein the installing member is prepared as a rail having a bar shape, and
wherein the apparatus further comprises first and second links connected to both ends of the installing member to adjust an installing distance and an installing angle of the installing member according to the distance between the bases and the installing angle of the base.

3. The apparatus of claim 2, wherein one end of the first link is coupled to one end of the installing member such that the first link is rotatable in a horizontal direction, and
an opposite end of the first link is coupled to the fixing unit such that the first link is rotatable in a vertical direction.

4. The apparatus of claim 2, wherein one end of the second link is coupled to an opposite end of the installing member such that the first link is rotatable in a horizontal direction, and
a coupling member is provided to an opposite end of the second link such that the coupling member is movable along the second link.

5. The apparatus of claim 2, wherein the fixing unit includes a first bracket fixed to the base; and
a second bracket coupled to one side of the first bracket such that the second bracket fixes the first link coupled to the installing member to allow the first link to be rotatable in the vertical direction, and
wherein the second bracket is provided with a connecting shaft inserted into a shaft hole formed in the first link.

6. The apparatus of claim 1, further comprising a pair of fixing members and fixing units coupled to the base to simultaneously install a pair of sensor modules adjacent to each other.

7. The apparatus of claim 2, further comprising a pair of fixing members and fixing units coupled to the base to simultaneously install a pair of sensor modules adjacent to each other.

8. The apparatus of claim 3, further comprising a pair of fixing members and fixing units coupled to the base to simultaneously install a pair of sensor modules adjacent to each other.

9. The apparatus of claim 4, further comprising a pair of fixing members and fixing units coupled to the base to simultaneously install a pair of sensor modules adjacent to each other.

10. The apparatus of claim 5, further comprising a pair of fixing members and fixing units coupled to the base to simultaneously install a pair of sensor modules adjacent to each other.

* * * * *